Patented June 19, 1945

2,378,551

UNITED STATES PATENT OFFICE 2,378,551

PROCESS FOR PRODUCING CONDENSATION PRODUCTS

Winfrid Hentrich, Dessau-Rosslau, and Wolfgang Gündel, Dessau, Germany; vested in the Alien Property Custodian No Drawing. Application June 18, 1941, Serial No. 398,640. In Germany June 19, 1940

5 Claims. (Cl. 260—607)

This present invention relates to condensation products and their production. More particularly it relates to the production of condensation products produced by reacting sulfinic acids with halohydrins and alkylene oxides.

Furthermore it relates to the production of esters of the condensation products with inorganic or organic acids.

It has been found that valuable condensation products are obtained by reacting halohydrins or alkylene oxides or halohydrins and alkylene oxides respectively upon sulfinic acids containing at least one aliphatic or alicyclic radical in the molecule or upon their salts respectively, and if necessary by esterifying the free hydroxyl groups present in the obtained condensation products with inorganic or organic acids.

Alkyl sulfinic acids which may be used as initial materials are for example ethyl, octyl, dodecyl, octadecyl sulfinic acid, a technical mixture of higher molecular alkyl sulfinic acids obtained by reduction of alkyl sulfonic acid chlorides produced from paraffin by reacting with chlorine and sulfur dioxide or from cyclohexyl, methylcyclohexyl and isooctylcyclohexyl sulfinic acid, further from tetrahydromenaphthyl sulfinic acid, n-octylbenzol sulfinic acid, isobutylnaphthyl sulfinic acid, isopropyltetrahydronaphthyl sulfinic acid, cresoxybenzol sulfinic acid and the like. The hydrocarbon radicals of the sulfinic acids may also contain oxygen, sulfur, nitrogen or halogen in substituents or in hetero atoms or hetero groups, which are introduced.

The production of the sulfinic acids is known. They are obtained for example by treating sulfonic acid halogenides with reducing agents such as zinc, further by reacting sulfur dioxide with the corresponding hydrocarbons in the presence of aluminum chloride or, in the aromatic series, by reacting alkali sulfide solutions with aromatic sulfo chlorides with heating.

According to this invention upon the sulfinic acids or their salts such as alkali salts halohydrins or alkylene oxides or halohydrins and alkylene oxides respectively are allowed to react. As halohydrins are used for this process for example ethylene chlorhydrin, glycerine-α-monochlorhydrin, β - chloro-β'-hydroxydiethyl - ether, pentaethylene glycolchlorhydrin and higher molecular chloro- or bromo-hydrins. The reaction is preferably performed upon salts of the sulfinic acids or, in the presence of acid-binding agents. Solvents or diluents may be employed, as well as pressure and advantageously increased temperatures. The working up of the condensation products is done in the usual manner. Then the thus formed condensation products containing hydroxyl groups in the molecule may be treated with alkylene oxides.

Alkylene oxides which may be applied for the reaction upon sulfinic acids or their salts as well as upon the aforesaid condensation products with halogen hydrins may be for example the ethylene oxide, further 1,2-propylene oxide, 1,2-butylene oxide, glycide, epichlorhydrin, cyclohexene oxide and the like. The reaction of the ethylene oxide is preferably performed in the presence of catalysts for example potassium ethylate and under pressure as well as at increased temperatures either with or without applying any solvents or diluents. The addition may be made in such a manner as to obtain products containing in the molecule one or more hydroxy-alkyl radicals. The condensation products having more than one hydroxy-alkyl radical may be watersoluble products. The number of ether radicals introduced is determined largely by the length of the hydrocarbon radicals of the sulfinic acids.

For a further enhancement of the water solubility the free hydroxyl groups of the obtained condensation products if necessary may be esterified with poly basic inorganic or organic acids e. g. with sulfuric acid, phosphoric acid, succinic acid, adipic acid, phthalic acid and the like.

According to the present process the following compounds may be obtained: butyl-(β-hydroxyethyl)-sulfone, the sulfuric acid ester of the octyl-(β-hydroxyethyl)-sulfone, dodecyl-(β,γ-dihydroxypropyl)-sulfone, methylcyclohexyl-(β - hydroxypropyl)-sulfone, n-octylbenzol-(β-hydroxyethyl)-sulfone, the addition product of eight mols of ethylene oxide to a technical mixture from hexadecyl- and octadecyl-sulfinic acid, the addition product of twelve mols of ethylene oxide to montanyl sulfinic acid etc.

These condensation products are of a particular industrial interest, if they are watersoluble and derived from higher molecular sulfinic acids containing at least one lipophile group that is a higher molecular aliphatic or cycloaliphatic radical of at least six carbon atoms or a cycloaliphatic or aromatic radical having an aliphatic side chain of at least four carbon atoms in the molecule. In this case they represent products having wetting-, emulsifying-, washing- and deterging-properties and may advantageously be applied as soap substitutes in the leather, fur and textile industry and especially in laundries. But the low molecular and nonwatersoluble condensation products are likewise of industrial interest by being applicable as softening and plastifying agents for cellulose derivatives, synthetic resins particularly of the poly vinyl series, natural or artificial caoutchouc and the like.

In the further development of the above described process it has been found that industrially valuable materials are obtained by introducing hydroxyether or hydroxypolyether radicals into unsubstituted or nonaliphatically or noncycloaliphatically substituted aromatic sulfinic acids by a treatment with halohydrins or 1,2-alkylene oxides or halohydrins and 1,2-alkylene oxides respectively.

In performing this process use may be made of initial materials such as benzene sulfinic acid, benzene-1,3-disulfinic acid, naphthalene sulfinic acids, naphthalene-1,5-disulfinic acid, naphthalene-1,3,5-trisulfinic acid, diphenyl sulfinic acids, anthracene, pyrene chrysene, phenanthrene, anthraquinone sulfinic acids and other monobasic and polybasic sulfinic acids which may also contain one or more substituents such as halogen atoms, nitro groups, acylamino groups, azo groups, alkoxy, aryloxy groups, trifluormethyl groups, alkyl or arylsulfone groups, alkyl or aryl mercapto groups, further OH—, HS—, H₂N—, COOH-groups and the like. Such compounds are for example 4-chlorobenzene sulfinic acid, 3,4-dichloro-benzene sulfinic acid, 2,5-dibromobenzene sulfinic acid, 3-nitrobenzene sulfinic acid, 3-nitro-4-chlorobenzene sulfinic acid, 5-nitro-2-bromobenzene sulfinic acid, 4-acetylaminobenzene sulfinic acid, 4-methoxybenzene sulfinic acid, 4-phenoxybenzene sulfinic acid, trifluormethylbenzene-3-sulfinic acid, diphenyl-sulfone - 3 - sulfinic acid, benzophenone-3-sulfinic acid, phenyl-n-butyl-sulfone-3-sulfinic acid, 2-chlorophenol-4,6-disulfinic acid, 1-amino-2,5-dichlorobenzene-4-sulfinic acid, 1-hydroxy-2-carboxy-benzene-4-sulfinic acid, 1-chloro- or 1-methyl-benzene-2,4-disulfinic acid, benzene-1-sulfinic acid-4-sulfonic acid, benzene-1-sulfinic acid-3-carboxylic acid, naphthalene-2-sulfinic acid-4,8-disulfonic acid and the like. Moreover the aromatic rings may also be condensed with heterocyclic ring systems for example in the quinoline-Bz-sulfinic acids or in carbazol- or diphenylene-oxide-mono- or polysulfinic acids respectively.

The manufacture of these sulfinic acids or their salts is known. It is performed for example by treating the corresponding sulfonic acid halides with reducing agents such as zinc, or by the reaction of alkali sulfite solutions upon the sulfonic acid chlorides with heat, or from aromatic diazonium compounds and sulfur dioxide in the presence of copper powder or from sulfur dioxide and aromatic hydrocarbons in the presence of Friedel-Crafts catalysts.

Upon the sulfinic acids or their soluble salts for example alkali salts according to the present invention halohydrins or 1,2-alkylene oxides or halohydrins and 1,2-alkylene oxides respectively are allowed to react.

One may use as halohydrins—as indicated above—e. g. ethylene chlorhydrin, glycerine-α-mono-chlorhydrin, β-chloro-β′-hydroxydiethyl-ether, pentaethyleneglycol chlorhydrin and other chloro- or bromohydrins or, respectively, halogen compounds of other ether-alcohols.

The condensation reaction is performed as described above. The working-up of the condensation products is carried out in the usual manner.

The thus formed condensation products having hydroxy groups in the molecule may further be treated with 1,2-alkylene oxides or halohydrins. This treatment is applied especially if by the conversion with the halohydrins only one alkyleneoxy radical has been introduced into the molecule, as it occurs for example in converting with ethylene chlorhydrin.

Thus one may produce the β-phenyl-sulfone-ethylalcohol from benzene sulfinic acid sodium and ethylene chlorhydrin and treat this compound with one or more mols of 1,2-alkylene oxides or, react in the form of the sodium compound of the phenyl-sulfone-ethyl-alcohol with halohydrins such as ethylene chlorhydrin, or, with the chlorhydrins of other polyvalent alcohols, especially of halohydrins of the poly glycols.

Furthermore the 1,2-alkylene oxides may be allowed to react upon halohydrins and the reaction products may be converted with the sulfinic acids.

The free hydroxy groups of the obtained addition products may be esterified, as described above, with monobasic or polybasic inorganic or organic acids.

The hydroxyether or hydroxypolyether sulfones obtained in this way such as phenyl-β-hydroxyethoxyethl sulfone, 3,4-dichloro-phenyl-β-hydroxyethoxy-hydroxyethoxy - ethyl sulfone, the addition product of three mols of ethylene oxide to 3-nitrobenzene sulfinic acid, of four mols of ethylene oxide to xenyl-4-sulfinic acid, of twelve mols of ethylene oxide to napthalene-α-sulfinic acid, of six mols of ethylene oxide to the benzene-1,3-disulfinic acid and the like have the properties of dissolving-, swelling-, plastifying- and softening agents for the manufacture of films, foils, plastic masses or artificial masses from gelatine, albuminous artificial masses, cellulose ethers, cellulose esters with low molecular fatty acids etc. They may also be applied as novel intermediate products for the synthesis of dyestuffs and remedies.

*Example 1*

203 parts by weight of a mixture of higher molecular alkyl sulfonic acid chlorides as obtained by the simultaneous reaction of chlorine and sulfur dioxide upon a paraffin fraction according to Fischer-Tropsch from boiling point 200 to 320° C., are dropped into a boiling mixture of 176 parts by weight of zinc powder and 700 parts by weight of water. After the addition is finished boiling is continued for a little while. After cooling it is filtered by means of suction and the filter cake which contains besides zinc oxide the zinc salt of the sulfinic acid, is stirred into a solution of 176 parts by weight of soda in 900 parts by weight of water. The mixture is heated up to boiling and filtered. From the alkaline soda solution by a careful acidifying with dilute sulfuric acid the free sulfinic acids are obtained, which are separated and dissolved in an equivalent amount of a 4% soda lye. If necessary the slightly alkaline solution is filtered and then treated in the autoclave at 100 to 200° C. with 400 parts by weight of ethylene oxide. After cooling the reaction mixture is neutralised with sulfuric acid and evaporated to dryness. To eliminate the inorganic impurities the residue is dissolved in alcohol, the solution is filtered, if necessary under addition of animal charcoal, and then the solvent is distilled off again. There remains a mass thickly liquid in the cold and soluble in water. The aqueous solution of the product possesses soap-like properties.

Example 2

27.4 parts by weight of crystallised dodecane sulfinic acid sodium together with eight parts by weight of ethylene chlorhydrin dissolved in 350 parts by weight of alcohol are heated under reflux up to boiling till the reaction is finished. After separating the sodium chloride formed the alcohol is distilled off finally under reduced pressure. The residue is dissolved in 150 parts by weight of xylol and after an addition of 0.2 part by weight of potassium ethylate is treated in the autoclave at 140° C. with 35.2 parts by weight of ethylene oxide. After expelling the solvent there remains upon cooling a waxlike solid mass soluble in water and having soaplike properties.

Example 3

200 parts by weight of crystallised benzene sulfinic acid sodium are dissolved in 800 parts by weight of water and converted in a stirring autoclave at 50–60° C. with 220 parts by weight of ethylene oxide, during which the introduction of the ethylene oxide is preferably done in portions. When the addition which begins rapidly is finished the mixture is warmed up for a little while to 90°. The reaction mixture now alkaline is neutralised by an addition of hydrochloric acid. Then the water is distilled off under reduced pressure. To eliminate the sodium chloride formed the residue is dissolved in alcohol and filtered if necessary under addition of animal charcoal. After evaporating the alcohol a clear oil easily soluble in water is obtained the sulfur and hydroxyl contents of which points to a condensation product of the approximate composition corresponding to the formula

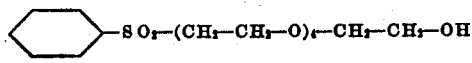

Example 4

230 parts by weight of crystallised p-chlorobenzene sulfinic acid sodium are converted with 100 parts by weight of ethylene chlorhydrin in a known manner. 110 parts by weight of the p-chlorophenyl-β-hydroxyethyl sulfone obtained by the conversion are dissolved in 500 parts by weight of xylol and treated with 140 parts by weight of ethylene oxide in the stirring autoclave after addition of 1 part by weight of potassium ethylate at 110 to 120° C. After finishing the reaction and working-up a thickly liquid oil easily soluble in water is obtained the characterising numbers of which point to a product of the approximate composition corresponding to the formula

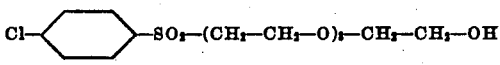

Example 5

40 parts by weight of ethylene chlorhydrin are dissolved in 120 parts by weight of water and are converted after addition of 1 part by weight of an 8% soda lye with 90 parts by weight of ethylene oxide at 110° C. in the stirring autoclave. When the reaction is finished, to the mixture 127 parts by weight of crystallised 3-nitrobenzene-sulfinic acid sodium are added and then the mixture is heated up for several hours under reflux with boiling. To isolate the formed poly oxethyl-3-nitrophenyl-sulfone the water is distilled off under reduced pressure, the residue is dissolved in alcohol, the separated sodium chloride is filtered off and the alcohol is distilled off again. After drying in the vacuo a dark-yellow oil remains which is easily soluble in water.

We claim:

1. The process for producing condensation products which comprises condensing a sulfinic acid salt having at least one unsubstituted aromatic radical in the molecule with at least an equimolecular proportion of a low molecular weight alkylene oxide.

2. The process for producing condensation products which comprises condensing a sulfinic acid salt with at least an equimolecular proportion of a low molecular weight alkylene oxide in the presence of an acid-binding agent.

3. The process for producing condensation products which comprises condensing a sulfinic acid salt with at least an equimolecular proportion of a low molecular weight alkylene oxide.

4. A new compound having the formula $$R_1.SO_2.(R_2O)_n.R_2OH,$$

wherein $R_1$ is an aryl radical, $R_2$ is a low molecular weight alkylene radical, and $n$ is at least three.

5. A new compound having the formula

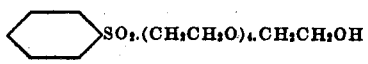

WINFRID HENTRICH.
WOLFGANG GÜNDEL.